(12) United States Patent
Bauman et al.

(10) Patent No.: US 6,415,364 B1
(45) Date of Patent: Jul. 2, 2002

(54) HIGH-SPEED MEMORY STORAGE UNIT FOR A MULTIPROCESSOR SYSTEM HAVING INTEGRATED DIRECTORY AND DATA STORAGE SUBSYSTEMS

(75) Inventors: Mitchell A. Bauman, Circle Pines; Eugene A. Rodi, Minneapolis, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/001,588

(22) Filed: Dec. 31, 1997

(51) Int. Cl.[7] ............................................. G06F 12/06
(52) U.S. Cl. ........................ 711/155; 711/168; 711/141; 710/20
(58) Field of Search ........................ 711/155, 167, 711/168, 141, 144; 710/5, 20, 21

(56) References Cited

U.S. PATENT DOCUMENTS

| | | | | |
|---|---|---|---|---|
| 5,081,575 A | * | 1/1992 | Hiller et al. | 710/132 |
| 5,559,970 A | * | 9/1996 | Sharma | 710/132 |
| 5,603,005 A | * | 2/1997 | Bauman et al. | 711/124 |
| 5,721,828 A | * | 2/1998 | Frisch | 709/217 |
| 5,784,582 A | * | 7/1998 | Hughes | 710/117 |
| 5,787,476 A | * | 7/1998 | Laudon et al. | 711/141 |
| 5,802,586 A | * | 9/1998 | Jones et al. | 711/155 |
| 5,860,159 A | * | 1/1999 | Hagersten | 711/151 |
| 5,864,738 A | * | 1/1999 | Kessler et al. | 709/239 |
| 5,974,514 A | * | 10/1999 | Andrewartha et al. | 711/166 |
| 6,044,438 A | * | 3/2000 | Olnowich | 711/150 |
| 6,049,476 A | * | 4/2000 | Laudon et al. | 365/52 |
| 6,073,211 A | * | 6/2000 | Cheng et al. | 711/122 |

OTHER PUBLICATIONS

Reisner, J et al. A Cache Coherency Protocol for Optically Connected parallel Computer Systems, IEEE High–Performance Computer Architecture, pp. 222–231, Feb. 1996.*
Agarwal, A et al, "The MIT Alewife Machine", IEEE Proceedings, Mar. 1999, pp. 430–444.*
M.S. Yousif et al. "Cache Coherent in Multiprocessors: A Survey", Academic Press, Inc., pp. 127–177, 1995.*

* cited by examiner

Primary Examiner—Matthew Kim
Assistant Examiner—Pierre Michel Bataille
(74) Attorney, Agent, or Firm—Mark T. Starr; Michael B. Atlass; Charles A. Johnson

(57) ABSTRACT

A high-speed memory system is disclosed for use in supporting a directory-based cache coherency protocol. The memory system includes at least one data system for storing data, and a corresponding directory system for storing the corresponding cache coherency information. Each data storage operation involves a block transfer operation performed to multiple sequential addresses within the data system. Each data storage operation occurs in conjunction with an associated read-modify-write operation performed on cache coherency information stored within the corresponding directory system. Multiple ones of the data storage operations may be occurring within one or more of the data systems in parallel. Likewise, multiple ones of the read-modify-write operations may be performed to one or more of the directory systems in parallel. The transfer of address, control, and data signals for these concurrently performed operations occurs in an interleaved manner. The use of block transfer operations in combination with the interleaved transfer of signals to memory systems prevents the overhead associated with the read-modify-write operations from substantially impacting system performance. This is true even when data and directory systems are implemented using the same memory technology.

19 Claims, 9 Drawing Sheets

MEMORY STORAGE UNIT (MSU)

MEMORY CLUSTER (MCL)

MSU EXPANSION
BLOCK DIAGRAM

WRITE/WRITE TIMING

READ/WRITE TIMING

HIGH-SPEED MEMORY STORAGE UNIT FOR A MULTIPROCESSOR SYSTEM HAVING INTEGRATED DIRECTORY AND DATA STORAGE SUBSYSTEMS

CROSS-REFERENCE TO OTHER APPLICATIONS

The following applications of common assignee contain some common disclosure, and are believed to have an effective filing date identical with that of the present application:

"A Directory-Based Cache Coherency System," filed Nov. 5, 1997, Ser. No. 08/965,004 incorporated herein by reference in its entirety; and "High Performance Modular Memory System With Crossbar Connection", filed Dec. 31,1997, Ser. No. 09/001,592, incorporated herein by reference in its entirety.

BACKGROUND OF THE INVENTION

1. Field of the Invention

This invention relates generally to memory units within a large scale symmetrical multiprocessor system, and, more specifically, to a high-performance memory having integrated directory and data subsystems that allow for the interleaving of memory requests to a single memory unit.

2. Description of the Prior Art

Data processing systems are becoming increasing complex. Some systems, such as Symmetric Multi-Processor (SMP) computer systems, couple two or more processors to shared memory. This allows multiple processors to operate simultaneously on the same task, and also allows multiple tasks to be performed at the same time to increase system throughput.

Although multi-processor systems with a shared main memory may allow for increased throughput, substantial design challenges must be overcome before the increased parallel processing capabilities may be leveraged. For example, the various processors in the system must be able to access memory in a timely fashion. Otherwise, the memory becomes a bottle neck, the processors may spend large amounts of time idle while waiting for memory requests to be processed. This problem becomes greater as the number of processors sharing the same memory increases.

One common method of solving this problem involves providing one or more high-speed cache memories that are more closely-coupled to the processors than the main memory. For example, a cache memory could be coupled to each processor. Information from main memory that is required by a processor during a given task may be temporarily stored within its respective cache so that many requests to memory will be off-loaded. This reduces requests to main memory to a number that is manageable, and allows memory latency to be reduced to acceptable levels.

When multiple cache memories are coupled to a single main memory for the purpose of temporarily storing data signals, some system must be utilized to ensure that all processors are working from the same (most recent) copy of the data. For example, if a copy of a data item is stored, and subsequently modified, in a cache memory, another processor requesting access to the same data item must be prevented from using the older copy of the data item stored either in main memory or the requesting processor's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data existed within a local cache, other processors were prohibited from obtaining a copy of the data from main memory until the updated copy was returned to main memory, thereby releasing the lock. For complex systems, the additional hardware and/or operating time required for setting and releasing the locks within main memory becomes too large a burden on through-put to be acceptable. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr., et al. These patents discuss a system wherein each processor has a local cache coupled to a shared memory through a common memory bus. Each processor is responsible for monitoring, or "snooping", the common bus to maintain currency of its own cache data. These snooping protocols increase processor overhead, and are unworkable in hierarchical memory configurations that do not have a common bus structure. A similar snooping protocol is shown in U.S. Pat. No. 5,025,365 to Mathur et al., which teaches local caches that monitor a system bus for the occurrence of memory accesses which would invalidate a local copy of data. The Mathur snooping protocol removes some of overhead associated with snooping by invalidating data within the local caches at times when data accesses are not occurring; however, the Mathur system is still unworkable in memory systems without a common bus structure.

Another method of maintaining cache coherency is shown in U.S. Pat. No. 5,423,016 to Tsuchiya, assigned to the assignee of this invention. The method described in this patent involves providing a memory structure utilizing a "duplicate tag" with each cache memory. The duplicate tags record which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time requited to route the invalidation requests poses an undue overhead.

For distributed systems having hierarchical memory structures, a directory-based coherency system has been found to have advantages. Directory-based coherency systems utilize a centralized directory to record the location and the status of data as it exists throughout the system. For example, the directory records which caches have a copy of the data, and further records if any of the caches have an updated copy of the data. When a processor makes a request to main memory for a unit of data, the central directory is consulted to determine where the most recent copy of that unit of data resides so that it may be returned to the requesting processor and the older copy may be marked invalid. The central directory is then updated to reflect the new status for that unit of memory. A novel system and method for performing a directory-based coherency protocol in a Symmetrical Multi-Processor (SMP) system is described in the co-pending application entitled "A Directory-Based Cache Coherency, System", filed Nov. 5, 1997, Ser. No. 08/965,004 which is incorporated herein by reference in its entirety.

Implementing high-speed memory systems that are capable of supporting a directory-based coherency protocol is problematic for several reasons. In general, accessing the central directory involves a read-modify-write operation. That is, generally, directory information is read from the directory, modified to reflect the fact that new status associated with the data item is being delivered to the requesting processor, and is written back to the directory. This read-modify-write operation cannot be completed as fast as the (single) associated data access to memory. Thus, another data access may not be initiated until the associated read-modify-write operation is complete and memory throughput is therefore diminished.

Prior art systems attempted to make this longer directory latency transparent to the overall system operation by implementing the central directory using faster hardware technology. For example, the memory array used to implement the central directory was implemented using faster Static Random Access Memory (SRAM) devices, whereas the memory array used to implement the data storage was designed using slower, but more dense, Dynamic Random Access Memory (DRAM) devices. This creates practical problems. Because SRAM devices are not as dense as DRAMs, a disproportionally large amount of circuit board area is consumed to implement the directory storage. Moreover, SRAMs and DRAMs have different power and other electrical considerations, adding to the complexity associated with designing, placing, and routing an operational printed circuit card. Additionally, two types of RAM devices must be stocked, then handled during the board-build process making fabrication of the printed circuit card a more difficult and expensive process. Implementing both the directory and data memory arrays using the same logic is practically much more desirable, but would result in a decrease in overall system throughput.

Another problem associated with memory systems capable of supporting directory-based coherency protocols is that such systems tend to under-utilize shared bus resources. For example, during the read phase of a read-modify-write operation to the directory array, an address is driven onto the address bus so that the directory state information may be read by the control logic. After the directory state information is read, and while it is being modified by the control logic, the address, data, and control buses are idle, and bandpass is essentially wasted. This intermittent pattern of bus usage can result in address and data buses that are idle as much as fifty percent of the time.

Objects

It is the primary object of the invention to provide an improved high-speed memory system that supports a directory-based coherency protocol;

It is a further object of the invention to provide an improved high-speed memory system that includes a directory storage facility and an associated data storage facility, wherein the directory storage facility is capable of processing memory requests at a similar rate as that of the data storage facility;

It is still a further object of the invention to provide an improved high-speed memory system that includes a directory storage facility and an associated data storage facility, wherein the directory storage facility utilizes the same hardware technology as an associated data storage facility, It is yet another object of the invention to provide an improved memory system including a directory storage facility and an associated data storage facility, wherein the memory system is coupled to high-speed data and address buses, and wherein operations to the memory system are interleaved so that the bus idle time is minimized;

It is yet a further object of the invention to provide an improved high-speed memory system which includes a directory storage facility and an associated data storage facility, wherein both the directory storage facility and the data storage facility include multiple banks of memory which may be accessed simultaneously during interleaved operations, It is another object of the invention to provide an improved high-speed memory system having multiple sub-systems, wherein each sub-system includes a directory storage facility and an associated data storage facility, and wherein operations may be performed substantially simultaneously to multiple ones of the sub-systems during interleaved operations, and It is still another object of the invention to provide an improved high-speed memory system having multiple sub-systems, wherein each sub-system includes a directory storage facility and an associated data storage facility, and wherein data is stored to, or retrieved from, each of the data storage facilities during multi-transfer operations wherein a single memory operation is completed during multiple transfers over a single interface.

SUMMARY OF THE INVENTION

The objectives of the present invention are achieved in a high-speed memory system for use in supporting a directory-based cache coherency protocol. The memory system includes at least one data sub-system for storing data, and a corresponding directory subsystem for storing the corresponding cache coherency information. The memory system may be coupled to multiple processors for accepting read and write memory requests from ones of the multiple processors.

When a processor submits a request for memory access to the memory system, two operations are initiated, one to a data sub-system, and the second to a corresponding directory sub-system. The data sub-system performs a block-mode memory read or write operation across the data sub-system data bus. In the preferred embodiment, each blockmode operation transfers a predetermined number of bytes across the data bus during a number of successive transfers. While the data sub-system is performing the block-mode data transfer, the directory sub-system executes a read-modify-write operation whereby directory information is read from the directory sub- system, modified by a memory controller, and written back to the directory sub-system. Because the data sub-system transfers blocks of data across the data bus during multiple transfer operations, the time required to perform the read-modify-write operation can approximate the time required to complete the data operation.

To further ensure that directory operations do not significantly limit system throughput, an interleaved memory scheme is utilized whereby a multiple number of read or write operations may be occurring to the data sub-system simultaneously. The associated read-modify-write operations to the directory sub-system are also interleaved. The time required to complete the multiple interleaved operations within both the data and directory sub-systems is approximately equivalent. Therefore, directory operations are made essentially transparent to the overall system throughput without using faster memory devices to implement the directory sub-system. This allows the memory system to be constructed using memory devices which are more dense, so that the overall memory system is more compact. Moreover, the overall memory design is less complex, and is less expensive to both design, construct, and test.

Another aspect of the current invention involves an improved management of bus resources. The data sub-system and directory sub-system are designed to share address, data, and control buses. This saves route channels used to route the nets within the printed circuit board. This is especially important in large memory systems requiring numerous control and address signals, such as the one described in this Specification. Moreover, because of the interleaving of memory requests, the shared address bus is not idle a large percentage of the time, as in prior art systems. During the times when the address bus would normally be idle, for example while directory state information for a first memory operation is being modified, another request address is driven onto the address bus to initiate a second memory operation. Then as the second memory operation is being performed, the address associated with the first request is re-driven onto the address bus so that the modified directory state information may be stored in the directory sub-system. Additionally, because data is transferred in blocks, and because memory operations are interleaved so that a first operation is using the data bus while a second operation is initiated within the storage devices, the data bus is also used in a more efficient manner. In sum, the current design allows for dramatically increased system throughput without an increase in the number of interconnecting nets needed to interface with each of the memory sub-systems.

Finally, the memory system of the current invention is a modular design that is readily expandable. In the preferred embodiment, the data and directory sub-systems are each located within separate Dual In-line Memory Modules (DIMMs) that are received by two sockets on a daughter board that constitutes an Main Storage Unit (MSU) Expansion. Each MSU Expansion is a Field Replaceable Unit (FRU) which may be easily replaced should memory errors be detected. In the preferred embodiment, each DIMM may include between 64 MegaBytes (Mbytes) and 256 MBytes of storage, so that each MSU Expansion may be populated with between 128 MBytes to 512 MBytes. Furthermore, the memory system may be incrementally expanded to include additional MSU Expansions as the memory requirements of the host system grow.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE SYSTEM OF THE PREFERRED EMBODIMENT

System Platform

Figure 1:
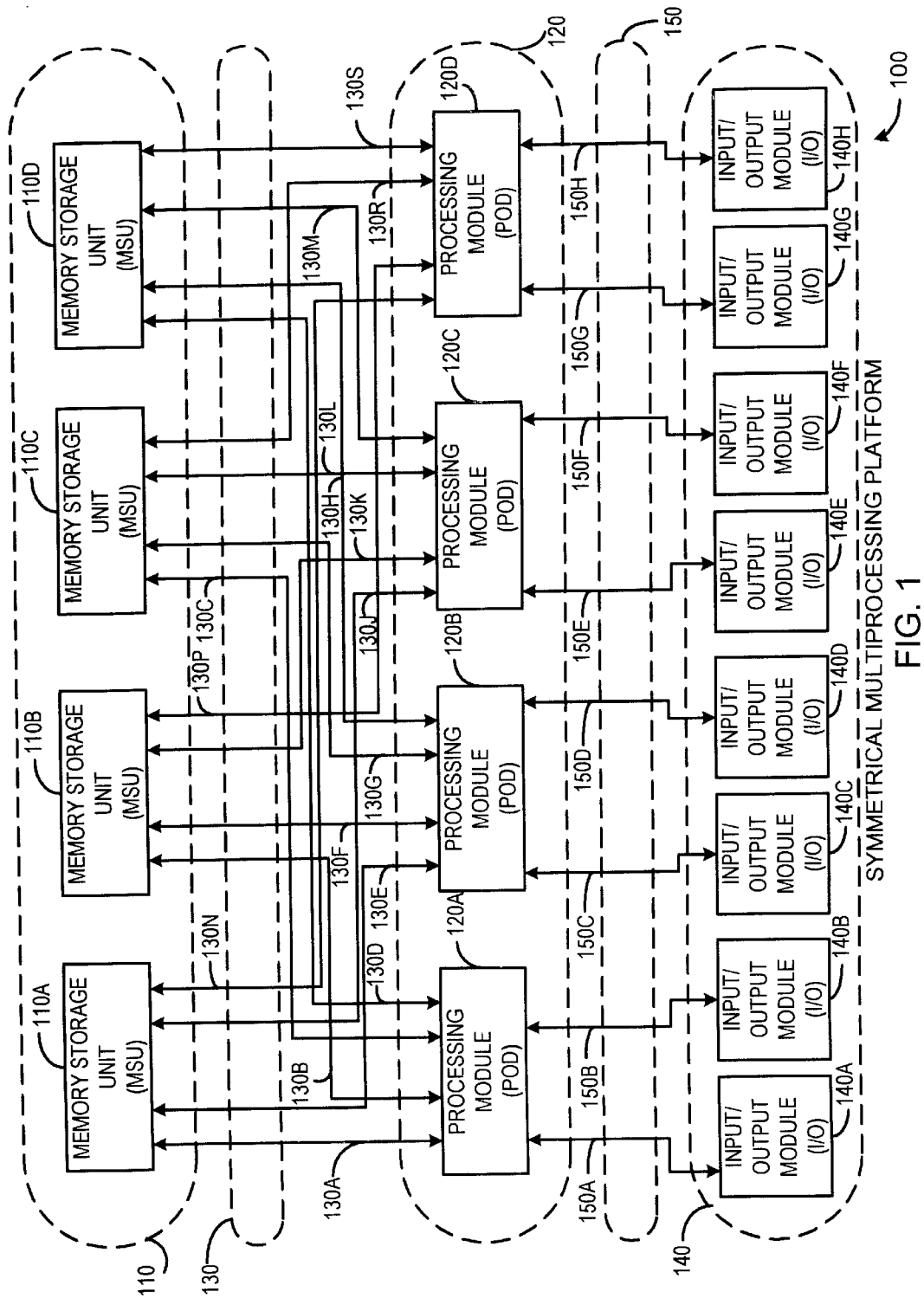
FIG. 1 is a block diagram of a Symmetrical Multi-Processor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all units in POD 120 via a dedicated, point-to-point connection referred to as an MSU Interface (MI) in dashed block 130, individually shown as 130A through 130S. For example, MI 130A interfaces POD 120A to MSU 110A, NE 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2× SYSCLK). In a preferred embodiment of the present invention, the system clock frequency is 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules 140 (shown as I/O Modules 140A through 140H) which provide the interface between various Input/Output devices and one of the PODs 120. Each I/O Module 140 is connected to one of the PODs across a dedicated point-to-point connection called the MIO Interface 150 (shown as 150A through 150H.) For example, I/O Module 140A is connected to POD 120A via a dedicated point-to-point MIO Interface 150A. The MIO Interfaces 150 are similar to the MI Interfaces 130, but have a transfer rate that is half the transfer rate of the MI Interfaces because the I/O Modules 140 are located at a greater distance from the PODs 120 than are the MSUs 110.

Processing Module (POD)

Figure 2:
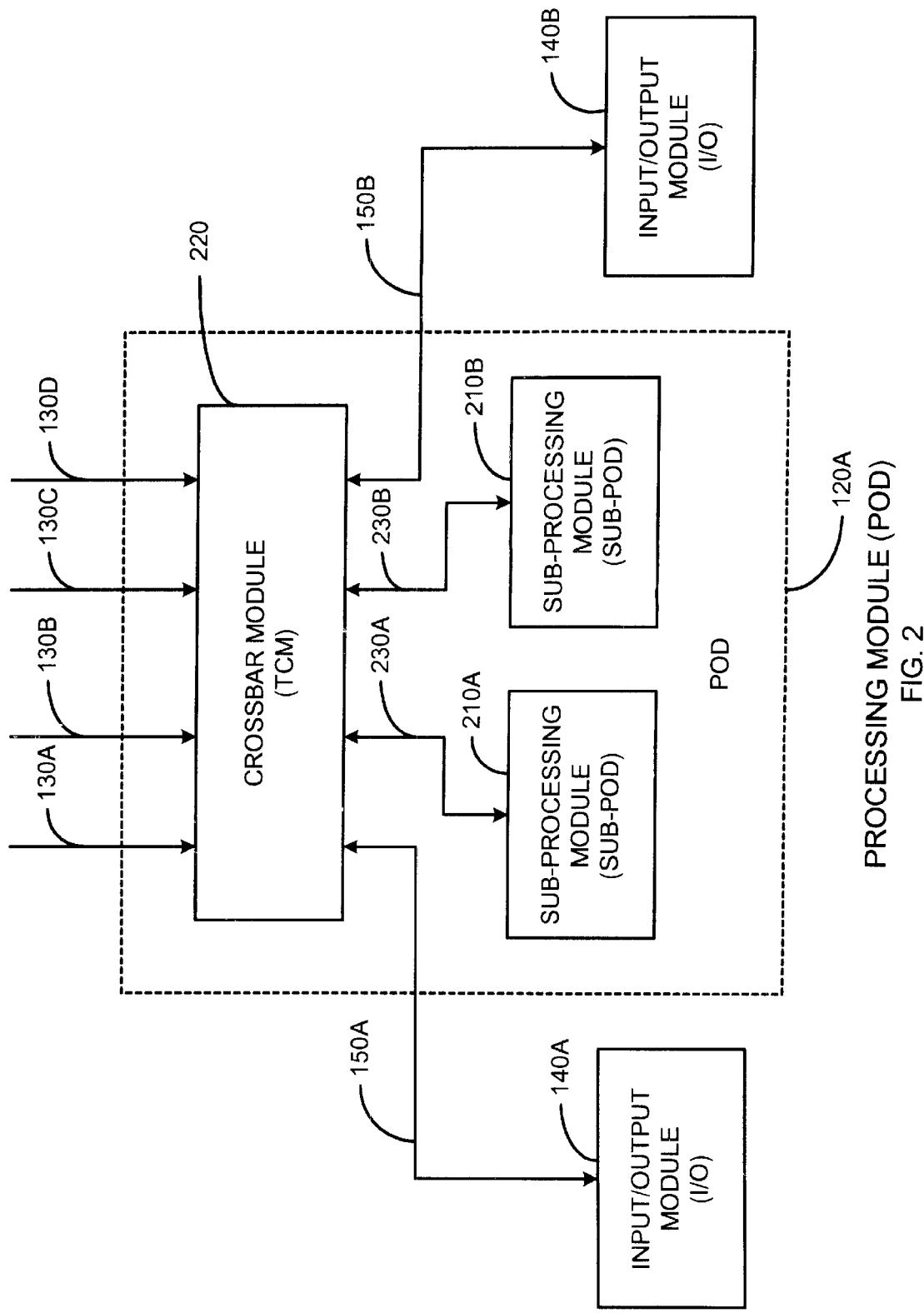
FIG. 2 is a block diagram of a Processing Module (POD) according to one embodiment of the present invention.

FIG. 2 is a block diagram of a processing module (POD) according to one embodiment of the present invention. POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MIs 130. TCM 220 further interconnects to one or more I/O Modules 140 via the respective point-to-point MIO Interfaces 150. TCM 220 both buffers data and functions as a switch between any of Interfaces 230A or 230B, or MIO Interfaces 150A or 150B, and any of the MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each Sub-POD 210 and each I/O Module 140 views memory as existing within a contiguous address space.

In one embodiment of the present invention, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210.

Memory Storage Unit (MSU)

Figure 3:
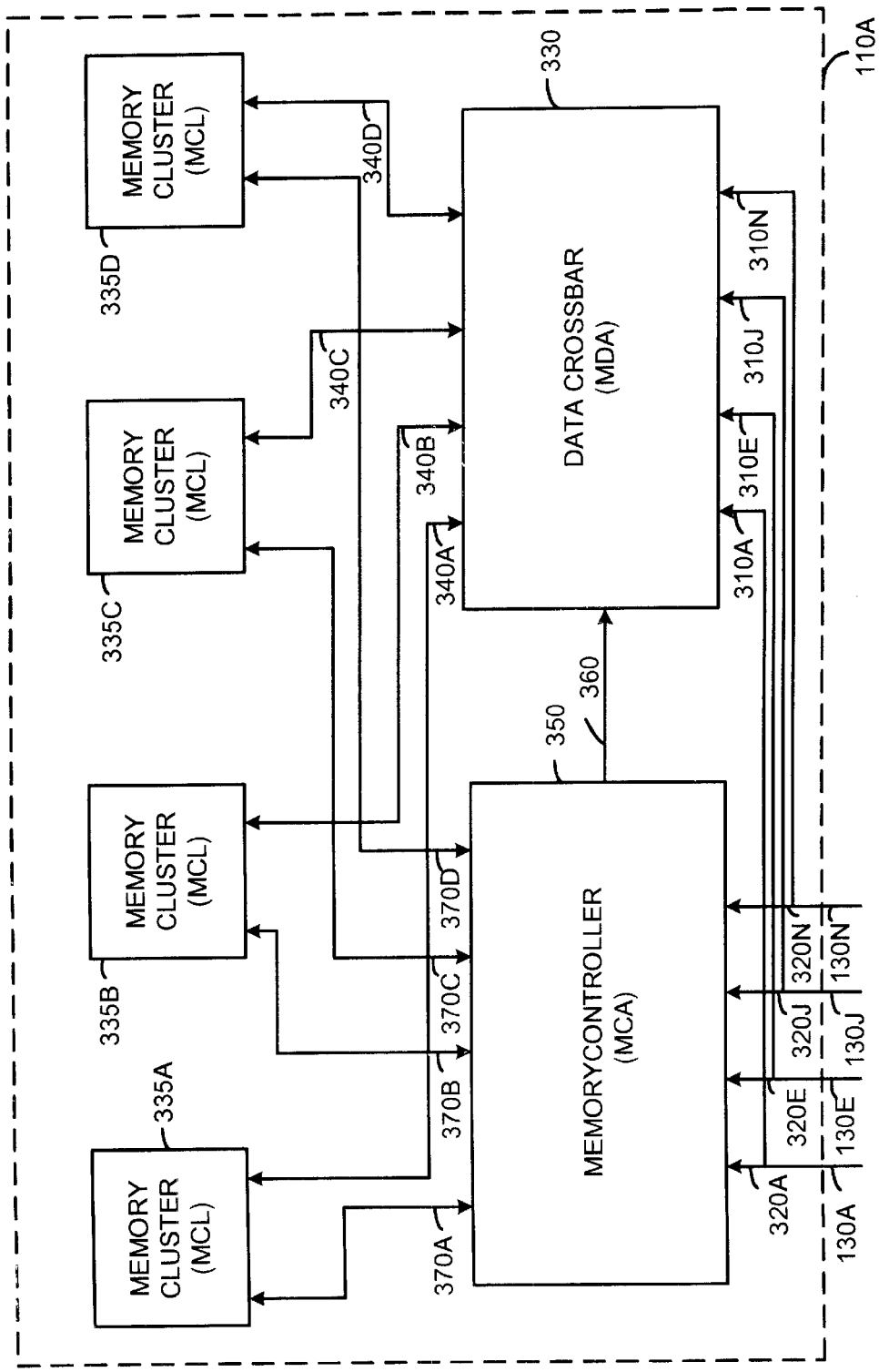
FIG. 3 is a block diagram of a Memory Storage Unit (MSU)

FIG. 3 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 contains Data Lines 310 (shown as 310A, 310E, 310J, and 310N) wherein each set of Data Lines 310 includes sixty-four bi-directional data bits, data parity bits, data strobe lines, and error signals (not individually shown.) Each set of Data Lines 310 is therefore capable of transferring eight bytes of data at one time. In addition, each MI Interface 130 includes bi-directional Address/command Lines 320 (shown as 320A, 320E, 320J, and 320N.) Each set of Address/command Lines 320 includes bi-directional address signals, a response signal, hold lines, address parity, and early warning and request/arbitrate lines.

A first set of unidirectional control lines from a POD to the MSU are associated with each set of the Data Lines 310, and a second set of unidirectional control lines from the MSU to each of the PODs are further associated with the Address/command Lines 320. Because the Data Lines 310 and the Address/command Lines 320 each are associated with individual control lines, the Data and Address information may be transferred across the MI Interfaces 130 in a split transaction mode. In other words, the Data Lines 310 and the Address/command Lines 320 are not transmitted in a lock-step manner.

In the preferred embodiment, the transfer rates of the Data Lines 310 and Address/control Lines 320 are different, with the data being transferred across the Data Lines at rate of approximately 200 Mega-Transfers per Second (MT/S), and the address/command information being transferred across the Address/command Lines at approximately 100 MT/S. During a typical data transfer, the address/command information is conveyed in two transfers, whereas the associated data is transferred in a sixty-four-byte packet called a cache line that requires eight transfer operations to complete.

Returning now to a discussion of FIG. 3, the Data Lines 310A, 31E, 310J, and 310N interface to the Memory Data Crossbar (MDA) 330. The MDA 330 buffers data received on Data Lines 310, and provides the switching mechanism that routes this data between the PODs 120 and an addressed one of the Memory Clusters (MCLs) 335 (shown as 335A, 335B, 335C, and 335D.) Besides buffering data to be transferred from any one of the PODs to any one of the MCLs, the MDA 330 also buffers data to be transferred from any one of the PODs to any other one of the PODs in a manner to be discussed further below. Finally, the MDA 330 is capable of receiving data from any one of the MCLs 335 on each of Data Buses 340 for delivery to any one of the PODs 120.

In the preferred embodiment, the MDA 330 is capable of simultaneously receiving data from ones of the MI Interfaces 130 while simultaneously providing data to any or all other ones of the MI Interfaces 130. Each of the MI Interfaces is capable of operating at a transfer rate of 64 bits every five nanoseconds (ns), or 1.6 GigaBytes/second for a combined transfer rate across four interfaces of 6.4 gigbytes/second. The MDA 330 is further capable of transferring data to, or receiving data from, each of the MCLs 335 across Data Buses 340 at a rate of 128 bits every 10 ns per Data Bus 340, for a total combined transfer rate across all Data Buses 340 of 6.4 GigaBytes/seconds. Data Buses 340 require twice as long to perform a single data transfer operation (10 ns versus 5 ns) as compared to Data Lines 310 because Data Buses 340 are longer and support multiple loads (as is discussed below). It should be noted that since the MDA is capable of buffering data received from any of the MCLs and any of the PODs, up to eight unrelated data transfer operations may be occurring to-and/or from the MDA at any given instant in time. Thus the MDA is capable of routing data at a combined peak transfer rate of 12.8 GigaBytes/second.

Control for the MDA 330 is provided by the Memory Controller (MCA) 350. MCA queues memory requests, and provides timing and routing control information to the MDA across Control Lines 360. The MCA 350 also buffers address, command and control information received on Address /command lines 320A, 320E, 320J, and 320N, and provides request addresses to the appropriate memory device across Address Lines 370 (shown as 370A, 370B, 370C, and 370D) in a manner to be described further below. As discussed above, for operations that require access to the MCLs 335, the address information determines which of the MCLs 335 will receive the memory request. For operations involving POD-to-POD transfers, the address provides routing information. The command information indicates which type of operation is being performed. Possible commands include Fetch, Flush, Return, I/O Overwrite, and a Message Transfer, each of which will be described below. The control information provides timing and bus arbitration signals which are used by distributed state machines within the MCA 350 and the PODs 120 to control the transfer of data between the PODs and the MSUs. The use of the address, command, and control information will be discussed further below.

As mentioned above, the memory associated with MSU 110A is organized into up to four Memory Clusters (MCLs) shown as MCL 335A, MCL 335B, MCL 335C, and MCL 335D. However, the MSU may be populated with as few as one MCL if the user so desires. Each MCL includes arrays of Synchronous Dynamic Random Access memory (SDRAM) devices and associated drivers and transceivers which are commercially readily available from a number of vendors. MCL 335A, 335B, 335C, and 335D is each serviced by one of the independent bi-directional Data Buses 340A, 340B, 340C, and 340D, respectively, where each of the Data Buses 340 includes 128 data bits. Each MCL 335A, 335B, 335C, and 335D is further serviced by one of the independent set of the Address Lines 370A, 370B, 370C, and 370D, respectively.

In the preferred embodiment, an MCL 335 requires 20 clock cycles, or 200 ns, to complete a memory operation involving a cache line of data. In contrast, each of the Data Buses 340 are capable of transferring a 64-byte cache line of data to/from each of the MCLs 335 in five bus cycles, wherein each bus cycle corresponds to one clock cycle. This five-cycle transfer includes one bus cycle for each of the four sixteen-byte data transfer operations associated with a 64-byte cache line, plus an additional bus cycle to switch drivers on the bus. To resolve the discrepancy between the faster transfer rate of the Data Buses 340 and the slower access rate to the MCLs 335, the system is designed to allow four memory requests to be occurring simultaneously but in varying phases of completion to a single MCL 335. To allow this interlacing of requests to occur, each set of Address Lines 370 includes two address buses and independent control lines as discussed below in reference to FIG. 4.

Directory Coherency Scheme of the Preferred Embodiment

Before discussing the memory structure in more detail, the data coherency scheme of the current system is discussed. Data coherency involves ensuring that each POD 120 operates on the latest copy of the data. Since multiple copies of the same data may exist within platform memory, including the copy in the MSU and additional copies in various local cache memories (local copies), some scheme is needed to control which data copy is considered the "latest" copy. The platform of the current invention uses a directory protocol to maintain data coherency. In a directory protocol, information associated with the status of units of data is stored in memory. This information is monitored and updated by a controller when a unit of data is requested by one of the PODs 120. In one embodiment of the present invention, this information includes the status of each 64-byte cache line. The status is updated when access to a cache line is granted to one of the PODs. The status information includes a vector which indicates the identity of the POD(s) having local copies of the cache line.

In the present invention, the status of the cache line includes "shared" and "exclusive." Shared status means that one or more PODs have a local copy of the cache line for read-only purposes. A POD having shared access to a cache line may not update the cache line. Thus, for example, PODs 120A and 120B may have shared access to a cache line such that a copy of the cache line exists in the Third-Level Caches 410 of both PODs for read-only purposes.

In contrast to shared status, exclusive status, which is also referred to as exclusive ownership, indicates that only one POD "owns" the cache line. A POD must gain exclusive ownership of a cache line before data within the cache line may be copied to a cache and subsequently modified within the cache. When a POD has exclusive ownership of a cache line, no other POD may have a copy of that cache line in any of its associated caches.

Before a POD can gain exclusive ownership of a cache line, any other PODs having local copies of that cache line must complete any in-progress operations to that cache line.

Then, if one or more POD(s) have shared access to the cache line, the POD(s) must designate their local copies of the cache line as invalid. This is known as a Purge operation. If, on the other hand, a single POD has exclusive ownership of the requested cache line, and the local copy has been modified, the local copy must be returned to the MSU before the new POD can gain exclusive ownership of the cache line. This is known as a "Return" operation, since the previous exclusive owner returns the cache line to the MSU so it can be provided to the requesting POD, which becomes the new exclusive owner. In addition, the updated cache line is written to the MSU sometime after the Return operation has been performed, and the directory state information is updated to reflect the new status of the cache line data. In the case of either a Purge or Return operation, the POD(s) having previous access rights to the data may no longer use the old local copy of the cache line, which is invalid. These POD(S) may only access the cache line after regaining access rights in the manner discussed above.

In addition to Return operations, PODs also provide data to be written back to an MSU during Flush operations as follows. When a POD receives a cache line from an MSU, and the cache line is to be copied to a cache that is already full, space must be allocated in the cache for the new data. Therefore, a predetermined algorithm is used to determine which older cache line(s) will be disposed of, or "aged out of" cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved. This write-back of data signals that have been aged from cache is known as a Flush operation.

Data is also written to an MSU 110 during I/O Overwrite operations. An I/O Overwrite occurs when one of the I/O Modules 140 issues an I/O Overwrite command to the MSU. This causes data provided by the I/O Module to overwrite the addressed data in the MSU. The Overwrite operation is performed regardless of which other PODs have local copies of the data when the Overwrite operation is performed. The directory state information is updated to indicate that the affected cache line(s) is "Present" in the MSU, meaning the MSU has ownership of the cache line and no valid copies of the cache line exist anywhere else in the system. All local copies of the cache line must be marked as invalid.

In addition to having ownership following an Overwrite operation, the MSU is also said to have ownership of a cache line when the MSU has the most current copy of the data and no other valid local copies of the data exist anywhere in the system. This could occur, for example, after a POD having exclusive data ownership performs a Flush operation of one or more cache lines so that the MSU thereafter has the only valid copy of the data.

Memory Clusters

Figure 4:
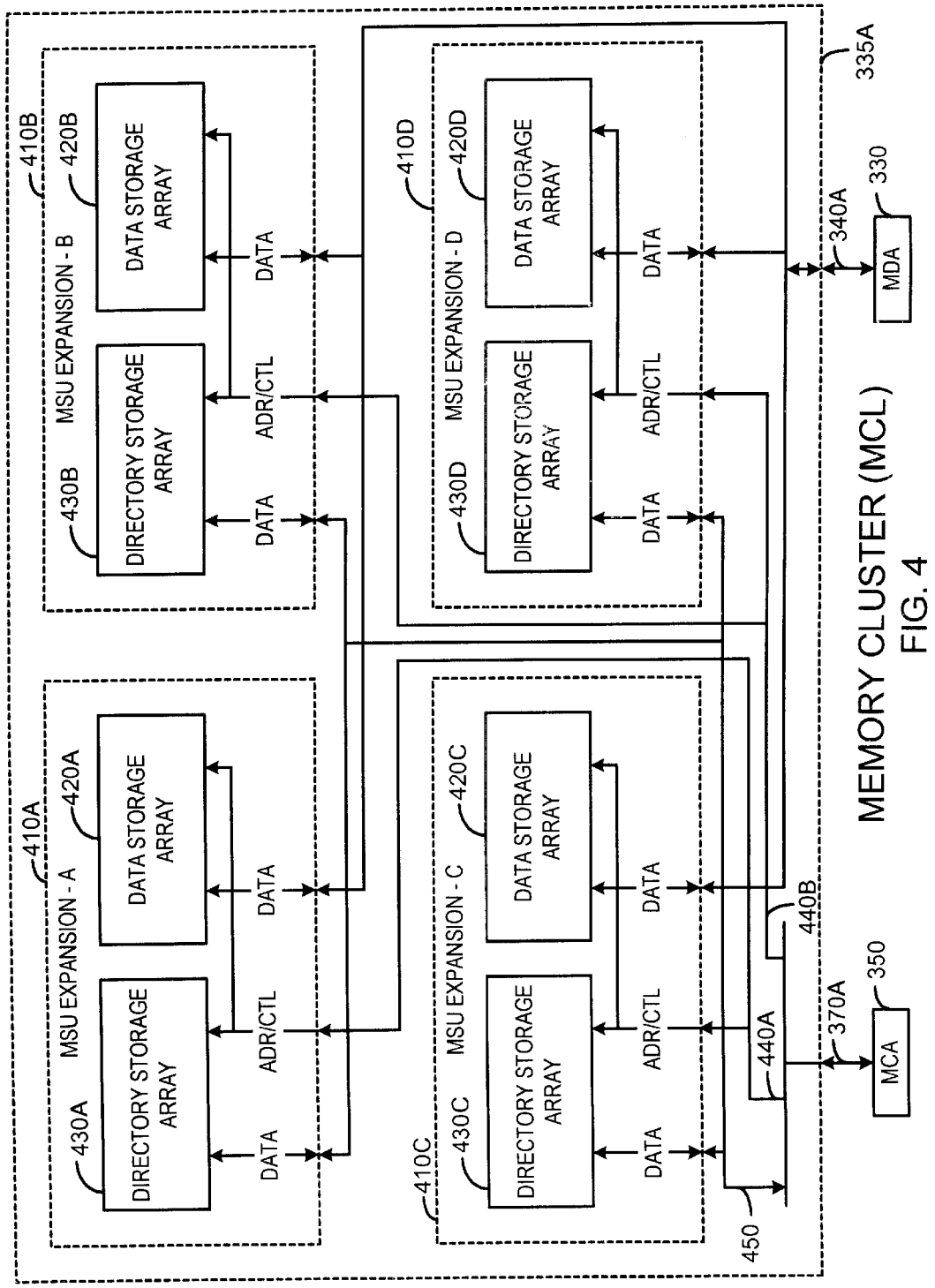
FIG. 4 is a block diagram of a Memory Cluster (MCL)

FIG. 4 is a block diagram of a Memory Cluster (MCL). Although MCL 335A is shown and described, the following discussion applies equally to all MCLs 335. An MCL consists of up to four MSU Expansions 410A, 410B, 410C, and 410D, where a MSU Expansion is the minimum amount of memory that an operational MSU 110 will contain. Each MSU Expansion 410 includes two Dual In-line Memory Modules (DIMMs, not individually shown). Since a fully populated MSU 110 includes up to four MCLs 335, and a fully populated MCL includes up to four MSU Expansions, a fully populated MSU 110 includes up to 16 MSU Expansions 410 and 32 DIMMs. The DIMMs can be populated with various sizes of commercially available SDRAMs. In the preferred embodiment, the DIMMs are populated with either 64 Mbyte, 128 Mbyte, or 256 Mbyte SDRAMs. Using the largest capacity DIMM, the MSU 110 of the preferred embodiment has a maximum capacity of eight GigaBytes, or 32 GigaBytes for the full SMP Platform 100.

Each MSU Expansion 410 contains two arrays of logical storage, Data Storage Array 420 (shown as 420A, 420B, 420C, and 420D) and Directory Storage Array 430 (shown as 430A, 430B, 430C, and 430D.) MSU Expansion 410A includes Data Storage Array 420A and Directory Storage Array 430A, and so on.

Each addressable word of the Data Storage Array 420 is 128 data bits wide, and is associated with 28 check bits, and four error bits (not individually shown.) This information is divided into four independent Error Detection and Correction (ECC) fields, each including 32 data bits, seven check bits, and an error bit. An ECC field provides Single Bit Error Correction (SBEC), Double Bit Error Detection (DED) within a field containing four adjacent data bits. Since each Data Storage Array 420 is composed of SDRAM devices which are each eight data bits wide, full device failure detection can be ensured by splitting the eight bits from each SDRAM device into separate ECC fields.

Each of the Data Storage Arrays 420 interfaces to the bi-directional Data Bus 340A which also interfaces with the MDA 330. Each of the Data Storage Arrays further receives selected ones of the address signals shown collectively as Address Line 370A driven by the MCA 350. As discussed above, Address Line 370A includes two unidirectional Address Buses 440 (shown as 440A and 440B), one for a pair of MSU Expansions 410. Data Storage Arrays 420A and 420C receive Address Bus 440A, and Data Storage Arrays 420B and 420D receive Address Bus 440B. This dual address bus structure allows multiple memory transfer operations to be occurring simultaneously to each of the Data Storage Arrays within an MCL 335, thereby allowing the slower memory access rates to more closely match the data transfer rates achieved on Data Buses 340.

Each addressable storage location within the Directory Storage Arrays 430 contains nine bits of directory state information and five check bits for providing single-bit error correction and double-bit error detection on the directory state information. The directory state information includes the status bits used to maintain the directory coherency scheme discussed above. Each of the Directory Storage Arrays is coupled to one of the Address Buses 440 from the MCA 350. Directory Storage Arrays 430A and 430C are coupled to Address Bus 440A, and Directory Storage Arrays 430B and 430D are coupled to Address Bus 440B. Each of the Directory Storage Arrays further receive a bi-directional Directory Data Bus 450, which is shown as included in Address Lines 370A, and which is used to update the directory state information.

The Data Storage Arrays 420 provide the main memory for the SMP Platform. During a read of one of the Data Storage Arrays 420 by one of the Sub-PODs 210 or one of the I/O modules 140, address signals and control lines are presented to a selected MSU Expansion 410 in the timing sequence required by the. commercially-available SDRAMs populating the MSU Expansions. The MSU Expansion is selected based on the request address. After a fixed delay, the Data Storage Array 420 included within the selected MSU Expansion 410 provides the requested cache line during a series of four 128-bit data transfers, with one transfer occurring every 10 ns. After each of the transfers, each of the SDRAMs in the Data Storage Array 420 automatically increments the address internally in predetermined fashion. At the same time, the Directory Storage Array 430 included within the selected MSU Expansion 410 performs a read-modify-write operation. Directory state information associated with the addressed cache line is provided from the Directory Storage Array across the Directory Data Bus 450 to the MCA 350. The MCA updates the directory state information and writes it back to the Directory Storage Array in a manner to be discussed further below.

During a memory write operation, the MCA 350 drives Address Buses 440 to the one of the MSU Expansions 410 selected by the request address. The Address Buses are driven in the timing sequence required by the commercially-available SDRAMs populating the MSU Expansion 410. The MDA 330 then provides the 64 bytes of write data to the selected Data Storage Array 420 using the timing sequences required by the SDRAMs. Address incrementation occurs within the SDRAMs in a similar manner to that described above.

DETAILED DESCRIPTION OF THE INVENTION OF THE PREFERRED EMBODIMENT

MSU Expansion

Figure 5A:
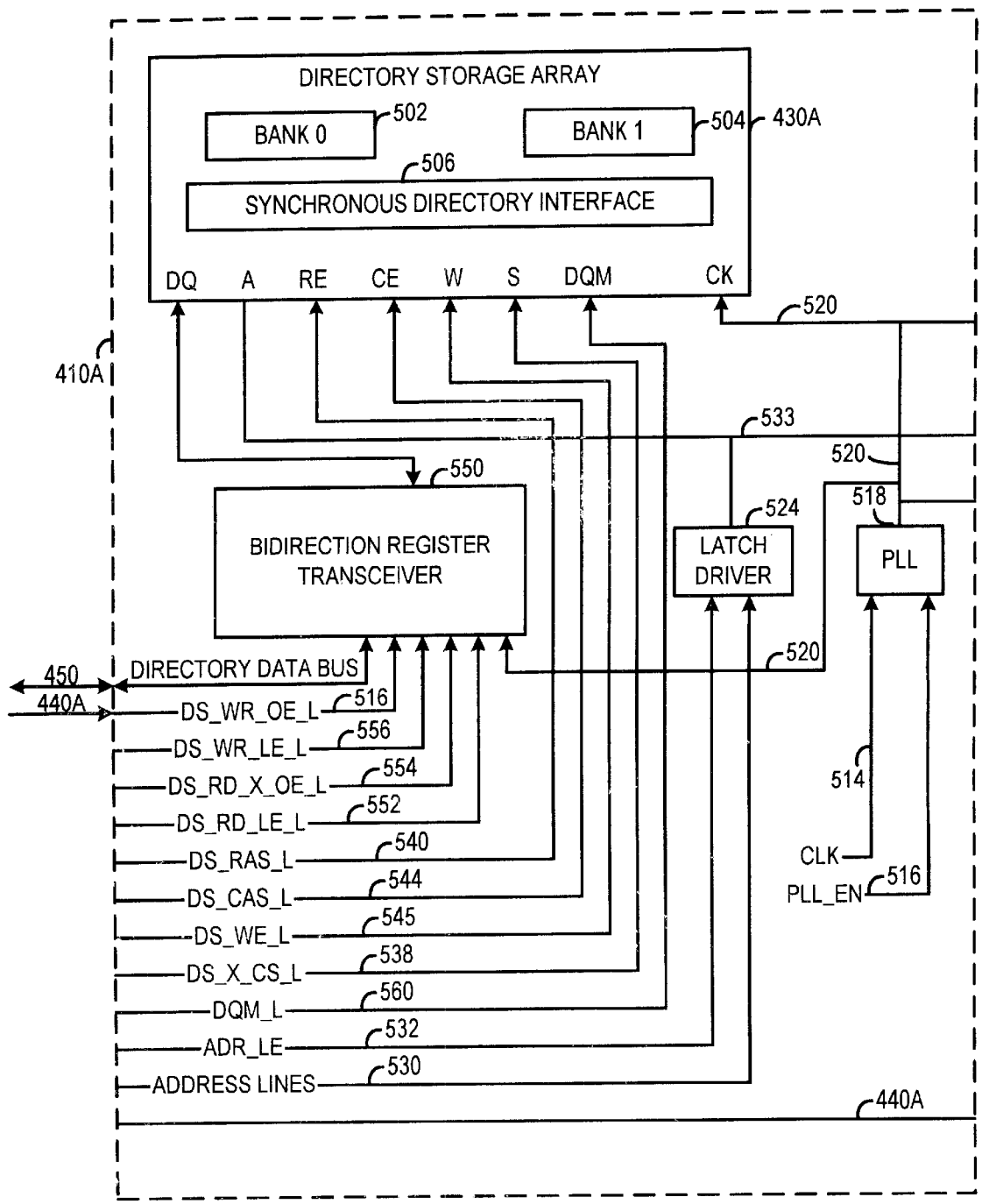
FIGS. 5A and 5B, when configured as shown in FIG. 5, is a block diagram of an MSU Expansion.
Figures 5, 5B:
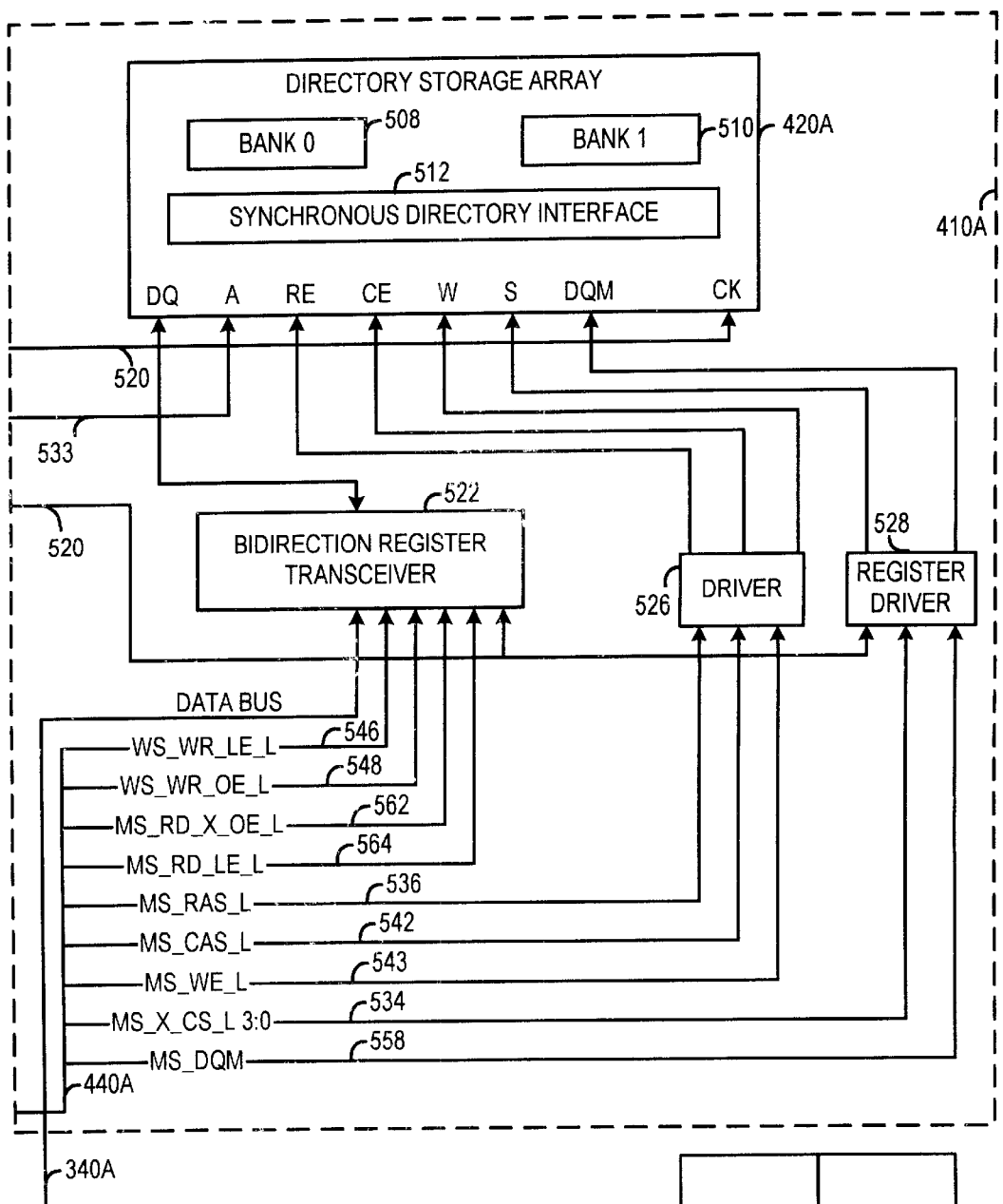

FIGS. 5A and 5B, when configured as shown in FIG. 5, are a block diagram of an MSU Expansion 410. MSU Expansion 410A is shown and described, but it is understood that this discussion applies to each MSU Expansion in the system. As discussed above, MSU Expansion 410A includes two storage arrays, Directory Storage Array 430A for storing the directory state information, and Data Storage Array 420A for storing the data. Each of the storage arrays is populated by commercially available Synchronous Dynamic Random Access Memory devices (SDRAMs) which are not individually shown. These SDRAM devices are "synchronous" because they have an internal synchronous interface for latching address and control information. Each of the SDRAM devices also include multiple banks of memory that may be accessed simultaneously through the synchronous interface.

The multi-bank capability provided by the SDRAMs is depicted logically in FIG. 5, with each of the storage arrays of the current embodiment shown having two banks of storage, with each bank being coupled to a synchronous interface. Directory Storage Array 430A includes Bank 0 502 and Bank 1 504, both of which are accessed synchronously through Synchronous Directory Interface 506. Similarly, Data Storage Array 420A includes Bank 0 508 and Bank 1 510, both of which are accessed via Synchronous Data Interface 512. The inventive memory system as described herein could function without any substantial modifications if storage arrays having more than two banks were incorporated into the design, although more addressing bits would be required to perform bank selection. Likewise, the multiple memory banks and the synchronous interface associated with each storage array could each be implemented using multiple discreet components without necessitating a substantial modification to the design.

The control, address, and data interface provided to MSU Expansion 410A allows the Directory Storage Array 430A and the Data Storage Array 420A to operate as a unified system. When operated in the interleaved manner described below, the directory information is read by the MCA from the Directory Storage Array, modified to reflect a change in data ownership, and written back to the Directory Storage Array in substantially the same time required to perform a read operation, and in a slightly longer time than that required to perform a write access to the Data Storage Array.

Thus, unlike prior art directory-based coherency systems, the Directory Storage Array does not significantly limit the performance of the entire memory system, even though the same memory technology is utilized to implement both the Directory Storage Array and the Data Storage Array. In addition, the current system takes full advantage of the bandpass of the Address Lines 370A from MCA 350, and Data Bus 340A from the MDA 330 by utilizing both memory banks so that two overlapped operations may be occurring to memory at the same time.

The control interface to the directory-based MSU Expansion 410A of the current invention includes Directory Data Bus 450, Data Bus 340A, and Address Bus 440A. Finally, the control of the interface includes the differential synchronizing clock signal CLK 514 having the same frequency as the system clock, which in the preferred embodiment is 100 Mhz, so that each clock cycle is 10 ns. The control further includes Phase Lock Loop Enable (PLL_EN) 516. These signals are received from the MSU clock distribution system within the MSU (not shown) and are provided to the Phase Lock Loop (PLL) 518, which ensures the clock is distributed on Clock 520 throughout the MSU Expansion with minimum clock skew so that maximum operating frequency can be obtained. The clock distribution system is beyond the scope of this patent, and will not be discussed further.

To further ensure that maximum operating frequency of 100 Mega-Transfers/Second is achieved, the fan-out must be carefully controlled through the use of buffering. This is particularly critical in the case of signals driven to the Data Storage Array 420A because each addressable storage location in the Data Storage Array 420A is 128 data bits wide, and further includes an additional 32 bits for ECC and error notification. In contrast, each storage location in the Directory Storage Array 430A only requires 14 bits. Therefore, many more SDRAMs are needed to implement the Data Storage Array than are needed to implement the Directory Storage Array, and additional drive capability is required to provide address, data, and control signals to the Data Storage Array devices. This drive capability is provided by Data Register Transceiver 522 which buffers Data Bus 340A, and by Driver 526 and Register Driver 528, each of which buffers ones of the signals shown collectively as Address Bus 440A in FIG. 4. Not only is buffering needed to provide the necessary drive capability to the Data Storage Array, but in the case of the address signals buffered by Latch Driver 524, Latch Driver 524 further serves to isolate the signals at MSU Expansion 410A from the MCA 350. This allows the MCA to initiate an operation to another MSU Expansion 410B, 410C, or 410D while an operation is being performed to MSU Expansion 410A. This will be discussed further below in association with the interleaving of requests.

Write Operations

Turning now to an explanation of write operations, the MCA 350 provides Row Address and Bank Selection signals on Address Lines 530 to Latch Driver 524. The Row Address is the standard row address of an X-Y matrix storage array as found in industry standard RAM devices including SDRAMs. The Bank Selection signals selects either Bank 0 508 or Bank 1 510 of Data Storage Array 420A to receive the Row Address. These signals are not latched within Latch Driver 524, but instead flow directly from Address/Control Bus 440 onto Line 533 to the Data Storage Array. The Row Address and Bank Selection signals are latched within Synchronous Interface 512 by an active edge of Clock .520 as enabled by the activation of the Main Store Chip Select (MS X_CS_L) 534 and the activation of the Main Store Row Address Strobe (MS_RAS_L) 536. The Row Address and Bank Selection signals are also provided on Line 533 to Directory Storage Array 430A, where they are latched within Synchronous Interface 506 by Clock 520 as enabled by the activation of the Directory Storage Chip Select (DS_X_CS_L) 538 and the activation of the Directory Storage Row Address Strobe (DS_RAS_L) 540. This assertion of MS_X_CS_L 534 and DS_X_CS_L 538 initiates the accesses to the SDRAMs, and provides a window during which other control signals such as MS_RAS_L 536 and DS_RAS_L 540 are sampled by Data Storage Array 420A and Directory -Storage Array 430A, respectively.

After several clock cycles, where a "clock cycle" is one cycle of Clock 520 which is 10 ns in the preferred embodiment, MCA 350 provides the Column Address of the X-Y matrix storage arrays of the SDRAMs on Address Lines 530, and shortly thereafter also drives Address Latch Enable Signal (ADR_LE) 532. The Column Address flows through Latch Driver 524 to Data Storage Array and Directory Storage Array, and is also latched in Latch Driver by the active edge of ADR_LE 532. MCA also drives Column Address Strobe (MS_CAS_L) 542, asserts MS_WE_L 543, and re-activates MS_X_CS_L 534. MS-CAS-L indicates that a valid Column Address is present, the assertion of MS_WE_L 543 indicates the Column Address is associated with a write operation, and the MS_X_CS_L 534 provides the window during which Data Storage Array samples MS_WE_L and MS_CAS_L. The MCA also drives Directory Storage Column Address Strobe (DS_CAS_L) 544, de-asserts DS_WE_L 545, and re-activates DS_X_CS_L 538 to the Directory Storage Array. DS_CAS_L indicates that a valid Column 10 Address is present, the de-activation of DS_WE_L indicates to the Directory Storage Array that the Column Address is associated with a read operation, and the DS_X_CS_L provides the window during which Directory Storage Array 430A samples DS_WE_L and DS_CAS_L.

During both transfers of the address, the MCA 350 provides the control 15 signals to the Data Storage Array 420A approximately one clock cycle before the corresponding signal is provided to Directory Storage Array 430A to account for the buffering delay associated the control signals to the Data Storage Array. For example, MS_X_CS_L 534 is provided approximately one clock cycle before DS_X_CS_L 538.

During write operations, the MCA 350 provides additional control signals to Register Transceiver 522 to control the flow of data to the Data Storage Array.

Assertion of Latch Enable MS_WR_LE_L 546, which is provided prior to the assertion of the MS_CAS_L 542, enables the latch to receive the data, which is driven onto Data Bus 340A by MDA 330 on the next active edge of Clock 520. Shortly thereafter, assertion of MS_WR_OE_L 548 allows the data to flow from Register Transceiver 522 to the Data Storage Array.

Each write operation transfers data from the MDA to the Data Storage Array in a block of 64 bytes, called a cache line. Data Bus 340A includes 128 data bits and 32 additional ECC and error bits. Therefore, a 64-byte transfer requires four transfer operations to complete. The MDA drives the first 16 bytes of data during the same clock cycle as the assertion of MS_CAS_L 542. Three additional transfers occur in the follow three clock cycles, so that the entire data transfer requires four clock cycles to complete.

Sometime after the write of the cache line to the Data Storage Array 420A, the MCA 350 provides control signals to Register Transceiver 550 to allow the directory state information for the cache line to be read by the MCA 350. MCA 350 asserts DS_RD_LE_L 552 to allow directory state information and associated ECC bits from the Directory Storage Array to be latched into Register Transceiver 550. Shortly thereafter, MCA drives DS_RD_X_OE_L 554 to enable Register Transceiver 550, which drives directory state information to MCA 350.

After MCA receives the directory state information, the MCA corrects any single bit errors, and updates the directory state information to reflect new access status. Since in this example, new data was written to the MSU 110, the operation involved either a Flush, I/O Overwrite, or a Return Operation. Therefore the new directory state information will reflect that either the MSU owns the cache line, or that the cache line now has a new exclusive owner.

While the new directory state information is being generated, the MCA re-drives the Column Address. This is necessary because, although Row Address and Bank Selection bits are latched within Synchronous Interface 506, the Column Address is not. Approximately two clock cycles after the Column Address is re-driven, the MCA drives the updated directory state information onto Directory Data Bus 450. MCA asserts DS_WR_LE_L 556 to enable Register Transceiver 550 to latch the data on the active edge of Clock 520. Several clock cycles later, MCA asserts DS_WR_OE_L 516 to enable the Register Transceiver 550 to drive the updated directory state information to the Directory Storage Array. Then the MCA asserts DS_X_CS_L 538, DS_WE_L 545, and DS_CAS_L 544 in a manner similar to that discussed above with respect to the Data Storage Array. This indicates to the Directory Storage Array 430A that a write operation is to be performed. The Directory Storage Array receives the updated directory status information from Register Transceiver 550, and writes it to the appropriate bank and address as determined by the Row Address, Column Address, and the Bank Selection bits.

Several other signals are used to control write operations. MCA 350 drives MS_DQM 558 to the Data Storage Array 420A to allow selected data include within a cache line to be stored. It operates like a mask to selectively pick out of a streaming 64-byte cache line the data to be stored in the Data Storage Array 420A. Likewise, the MCA drives DQM_L 560 to the Directory Storage Array 430A. Although the Directory Storage Array always stores the same number of bits of directory state information during each read-modify-write operation, this signal can not be tied inactive because it is used during initialization of the SDRAMs following a reset of the MCL.

Figure 6:
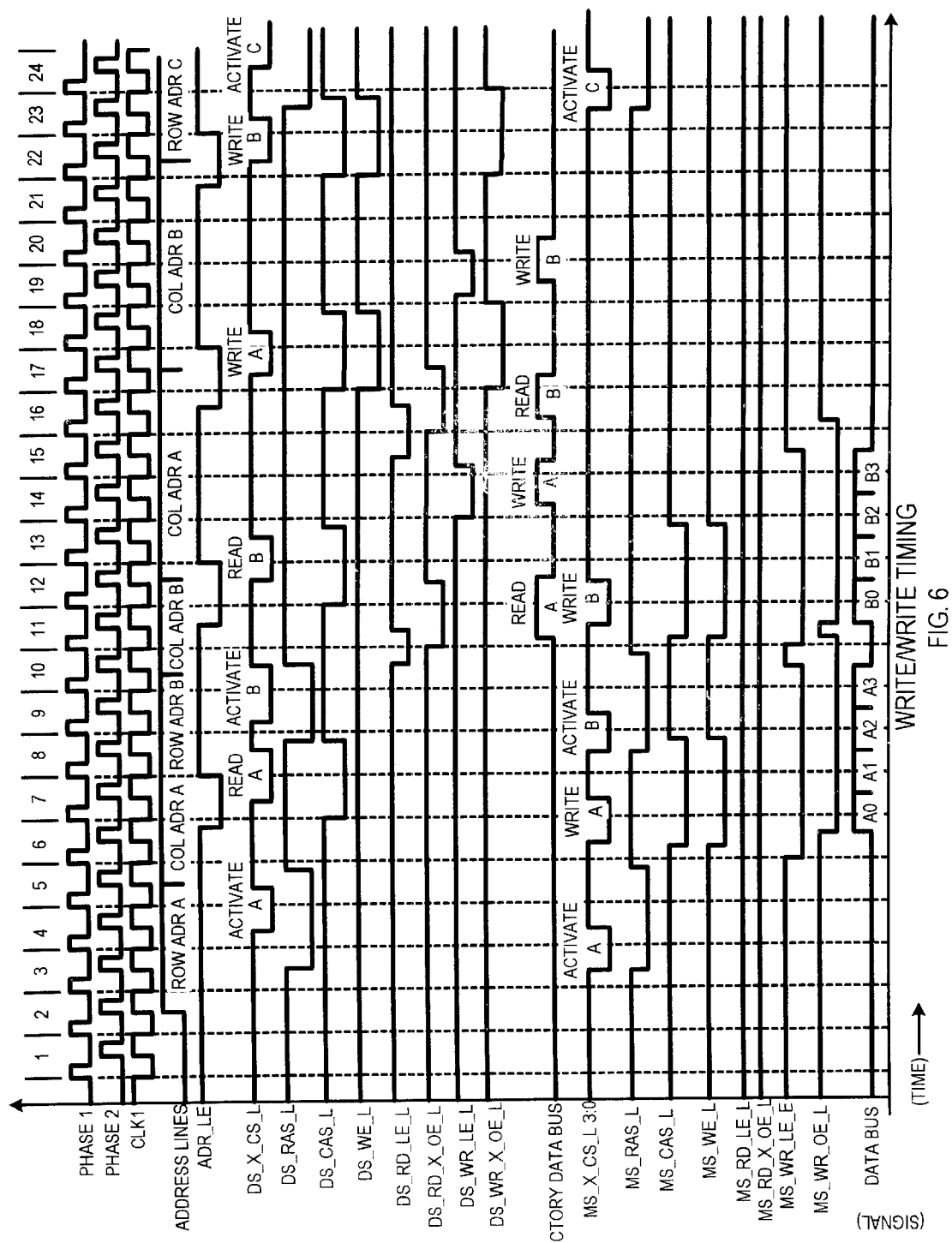
FIG. 6 is a timing diagram of two sequential Write Operations performed to the same MSU Expansion.

FIG. 6 is a timing diagram showing the interleaving of two successive write operations to the same MSU Expansion 410A. This interleaving is possible because the Directory Storage Array and Data Storage Array each includes multiple storage banks which may each operate in parallel. As discussed above, although the preferred embodiment utilizes memory devices having two banks incorporated within the same physical package, this is not a requirement. The current invention could be implemented with multiple different number of memory banks, and these memory banks could be implemented using discreet components.

Returning now to the above example, assume that the above-described write operation is occurring to "Address A" in Bank 0 508 of the Data Storage Array 420A and Bank 0 502 of the Directory Storage Array 430A. Another write operation to "Address B" can be initiated to Bank 1 as follows. In the clock cycle following the de-assertion of the Address A column address on Address Lines 530 and while the write data for Address A is being provided over Data Bus 340A to Bank 0, MCA drives the Address B Row Address and the accompanying Bank Selection signals selecting Bank 1 510 to Data Storage Array 420A. Approximately three clock cycles later and substantially simultaneously with the completion of the write data transfer operation to Bank 0, the Address B Column Address for the Bank 1 operation is provided. The associated control sequences are asserted to both the Data Storage Array 420A and the Directory Storage Array 430A in the manner described above with respect to the Bank 0 operation. Approximately one clock cycle after the last 16-byte data transfer operation is performed to Bank 0, the write data for Bank 1 is provided on Data Bus 340A.

Because seven clock cycles are required from the time one of the banks are activated until read data is available, the directory state information for Address A is not available from Bank 0 502 until the time write data for Address B is being driven on Data Bus 340A to Bank 1. While the four transfer operations are being performed to Bank 1 510, the MCA 350 receives the directory state information for Address A and begins the modification process. During this time, the column address for Address B no longer needs to be asserted, and the MCA begins re-driving the Address A column address in preparation for writing the modified directory state information to Bank 0 502 of the Directory Storage Array. The MCA provides the updated directory state information to BiDirection Register Transceiver 550 about the same time the directory state information for Address B is read from Bank 1 504 of the Directory Storage Array. Both of these transfers are latched into the BiDirection Register Transceiver, which is capable of storing data received from both interfaces at the same time. About one clock cycle later, the MCA receives the directory state information for Address B, and one clock cycle after that, the updated directory state information for Address A is stored in Bank 0 502 of the Directory Storage Array. Immediately after the Address A column address is de-asserted from Address Lines 530, the MCA drives the Address B column address in preparation to write the updated directory state information to the Directory Storage Array. While the write operation for the updated directory state information is being completed, the Address B column address is de-asserted, and another Row Address can be provided on Address Lines 530 to initiate the next memory operation to Bank 0 502.

In the above-described manner, the interleaving is performed for two successive write operations to Addresses A and B. The Address Lines 530, Data Bus 430A, and the control lines are fully utilized by the interleaved operations, thereby providing maximum throughput with the minimum number of interconnections required between the MCA 350 and the MSU Expansion 410A. In addition, the time required to handle the directory state information is at least partially "buried" by the block data transfers to the Data Storage Array 420A. FIG. 6 shows that the Address C Row Address is driven on the Address Lines approximately seven clock cycles after the fourth transfer operation from Address B is performed. Since the two write operations to Addresses A and B actually involve eight individual data transfer operations, the average overhead associated with the read-update-write operation for the directory storage is less than one clock cycle per data transfer operation. This is far less than the approximately ten clock cycles per data transfer operation that is associated with a similar system that does not utilize interleaving-and block-mode transfers. This can be seen in Figure by counting the number of clock cycles that would elapse after the first data transfer to Address A is performed, and the time the Address A Column Address may be de-asserted after the read-modify-write operation is performed. Thus, the memory system of the current invention dramatically reduces system overhead, and improves throughput, while allowing both the Directory Storage Array and the Data Storage Array to be implemented using the same technology It should be noted that the read-modify-write time can not be made completely transparent during successive write operations as it can during successive read operations as will be discussed below. That is, the read-modify-write operations to Addresses A and B are not completed until after the data write operation to Address B is completed. This is because of the memory latency associated with the read of the directory state information is not imposed on an associated data write operation. However, since statistically, more read operations occur within main memory than do write operations, the time required to perform the read-modify-write operations using the interleaved approach of this invention can generally be made essentially transparent. This will become more apparent in the following example.

Read Operations

Figure 7:
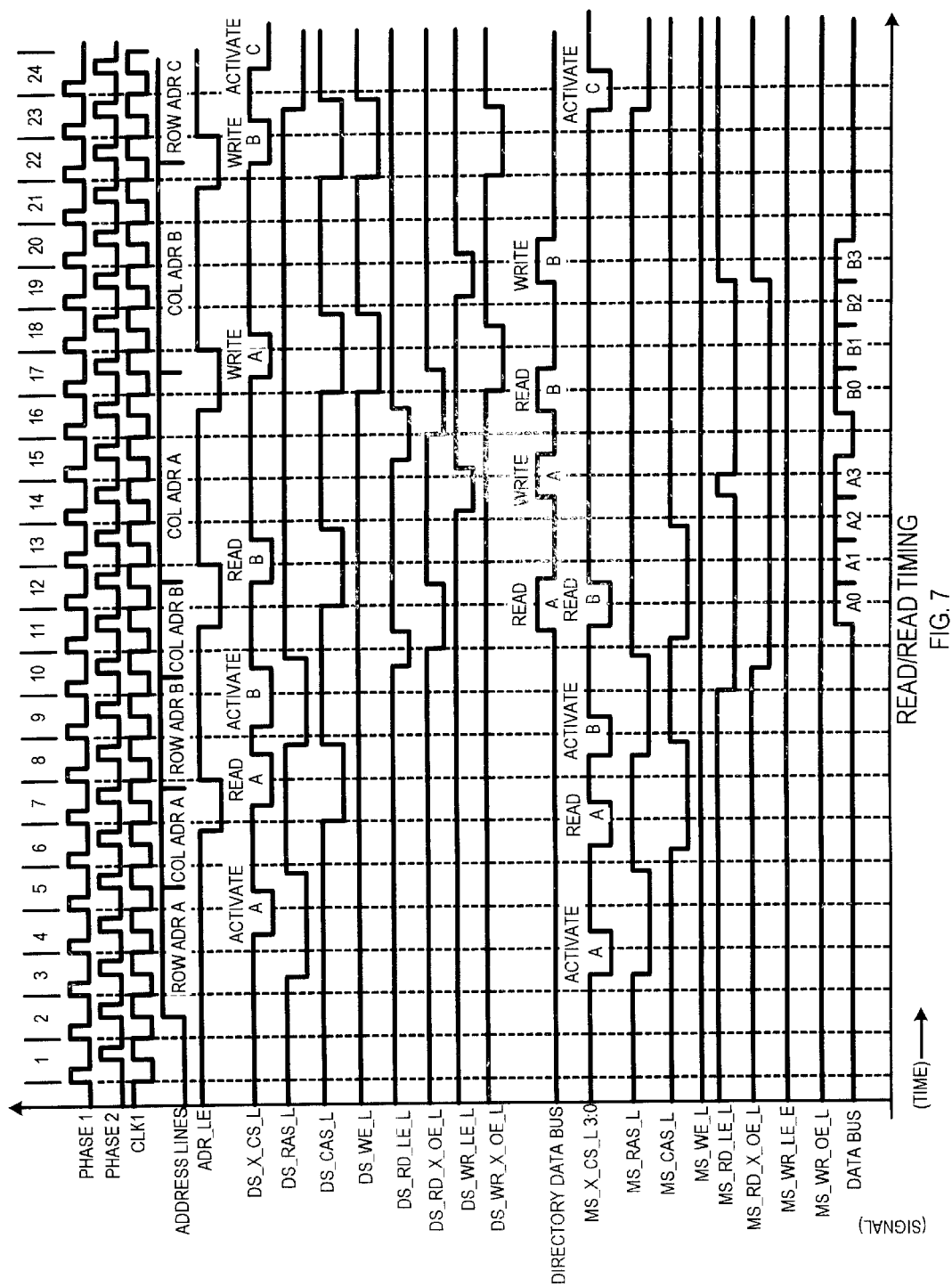
FIG. 7 is a timing diagram of two sequential Read Operations performed to the same MSU Expansion.

FIG. 7 is a timing diagram of two successively performed Read Operations to MSU Expansion 410A shown as read operation to Address A followed by read operation to Address B. For illustration purposes, Address A will be said to map to Bank 0 of MSU Expansion 410A, and Address B will map to Bank 1.

Read operations are performed in a manner similar to that discussed above with respect to write operations. The MCA provides a Row Address and Bank Selection signals on Address Lines 530. These signals flow through Latch Driver 524, onto Line 533, and are latched within Synchronous Interface 512 and Synchronous Interface 506 of Data Storage Array and Directory Storage Array, respectively, by an active edge of Clock 520. MCA further actives signals MS_X_CS_L 534 and MS_RAS_L 536 to initiate bank activation within Data Storage Array 420A, and activates signals DS_X_CS_L 538 and DS_RAS_L 540 to initiate bank activation within Directory Storage Array 430A. As discussed above, the respective ones of these signals are provided to the Data Storage Array one clock cycle prior to being provided to the Directory Storage Array to compensate for the buffering delay times associated with the Data Storage Array.

After bank activation within the Directory Storage Array has been initiated, MCA 350 provides the Address A Column Address on Address Lines 530, through Latch Driver 524, and onto Lines 533. The Address A Column Address is also latched in Latch Driver by the active edge of ADR_LE 532. MCA also drives MS_CAS_L 542 to indicate that a valid Column Address is present on Lines 533, and re-activates MS_X_CS_L 534. The assertion of MS_X_CS_L provides the window during which Data Storage Array samples signals MS_CAS_L and MS_WE_L. MS_WE_L is de-asserted to indicate that a read operation is occurring. In a similar manner, the MCA drives DS_CAS_L 544, de-asserts DS_WE_L 545, and re-activates DS_X_CS_L 538 to indicate that a read operation is being performed to Directory Storage Array 430A.

Before the control signals for the Address A read operation are de-asserted, the MCA may begin driving the Address B Row Address and Bank Selection signals on Address Lines 530. While Address B is being driven, and after the control signals for Address A are de-asserted, the MCA drives the control signals as discussed above to the Data Storage Array and Directory Storage Array to active Bank 1 for the Address B read operation.

While the activation of Bank 1 is occurring within the Data Storage Array 420A, data signals are also being provided from Data Storage Array for the Bank 0 Read Operation. The MCA asserts control signals to BiDirection Register Transceiver 522 to control the flow of Address A read data from Data Storage Array to the MDA. MCA asserts Main Store Read Output Latch Enable (MS_RD_X_OE_L) 562 to allow the Address A cache line to flow from the Data Storage Array through BiDirection Register Transceiver 522 to Data Bus 340A. The MCA further asserts MS_RD_LE_L 564 to latch the data into the write data 30 register (not shown) within the BiDirection Register Transceiver on the next active edge of Clock 520. During four successive clock cycles, the 64-byte cache line associated with Address A is pipelined through the BiDirection Register Transceiver and provided to the MDA 330.

One clock cycle after the assertion of MS_RD_X_OE_L 562, the MCA 350 asserts DS_RD_LE_L 552 and DS_RD_X_OE_L 554 to BiDirection Register Transceiver 550 to allow directory state information for Address A to be received from the Directory Storage Array, latched into Register Transceiver 550, and read by MCA 350 in the manner discussed above so that a read-modify-write operation can be performed.

While the MCA is performing the read-modify-write operation and the MDA completes the transfer of the 64-byte cache line for Address A, the MCA drives the Address B Column Address on Address Lines 530 to the Directory Storage Array and Data Storage Array. MCA also provides the associated control signals MS_CAS_L 542, MS_X_CS_L 534, DS_CAS_L 544, and DS_X_CS_L 538, and de-asserts MS_WE_L and DS_WE_L 545 to initiate read operations for . Address B within both of the storage arrays.:

After the Address B Column Address is driven for the requisite time by MCA 350 as required by the SDRAMs, the Address A Column Address may be. re-driven to perform the write of updated Address A directory state information in the manner discussed above. DS_WR_LE_L 556 enables latching of the updated directory state information for Address A into the write register (not shown) within BiDirection Register Transceiver 550. Several clock cycles later, DS_WR_OE_L 516 enables BiDirection Register Transceiver to drive the updated Address A directory state information to Directory Storage Array. The MCA provides the requisite control signals which allow this information to be stored in Bank 0 502 in the manner discussed above.

Approximately at the time the Address A directory state information is being provided by the MCA to the BiDirection Register Transceiver 550, the Address B directory state information is being provided by the Directory Storage Array to the read register (not shown) within BiDirection Register Transceiver 550. MCA asserts DS_RD_LE_L 552 to enable latching of this information by the active edge of Clock 520, and then asserts DS_RD_X_OE_L 554 to enable the Address B directory state information to flow to the MCA.

As the Address B directory state information is being provided to MCA 350, MCA is further driving MS_RD_LE_L 564 and MS-RD_X_OE-L 562 to enable the first 16-bytes of the Address B data to be received by the MDA 340. The 64-byte cache line is transferred in four successively performed operations requiring four bus cycles to complete.

While the Address B data transfer is completing, the Address B Column Address is re-driven onto Address Lines 530 in preparation to write the updated Address B directory state information. Several clock cycles later, the MCA drives the updated directory state information onto Directory Data Bus 450, and further drives the control signals to the BiDirection Register Transceiver 550 and Directory Storage Array in the manner discussed above so that the write operation may be performed. At this same time, the MCA may already be driving a third address, shown as Address C, on Address Lines 530 in preparation to re-activate Bank 0 for yet another memory request.

FIG. 7 shows how multiple, successively-performed Read Operations combined with the interleaved handling of requests essentially buries the time required to handle directory state information. The last data transfer operation associated with Read Operation to Address B occurs approximately two clock cycles before the MCA begins driving Address C onto Address Lines 530 to initiate the next transfer operation. This overhead, when averaged over the eight read data transfer operations, amounts to just several nanoseconds per transfer operation. If interleaving and block transfers were not utilized, the time from the read data transfer operation to the time the next address could be driven to initiate the next memory operation would be approximately five clock cycles per data transfer. This is apparent from FIG. 7, wherein over five clock cycles elapse from the time the first read transfer occurs to Address A to the time the Address A Column Address is de-asserted following the read-modify-write operation for Address A.

Read Operation Followed by a Write Operation

Figure 8:
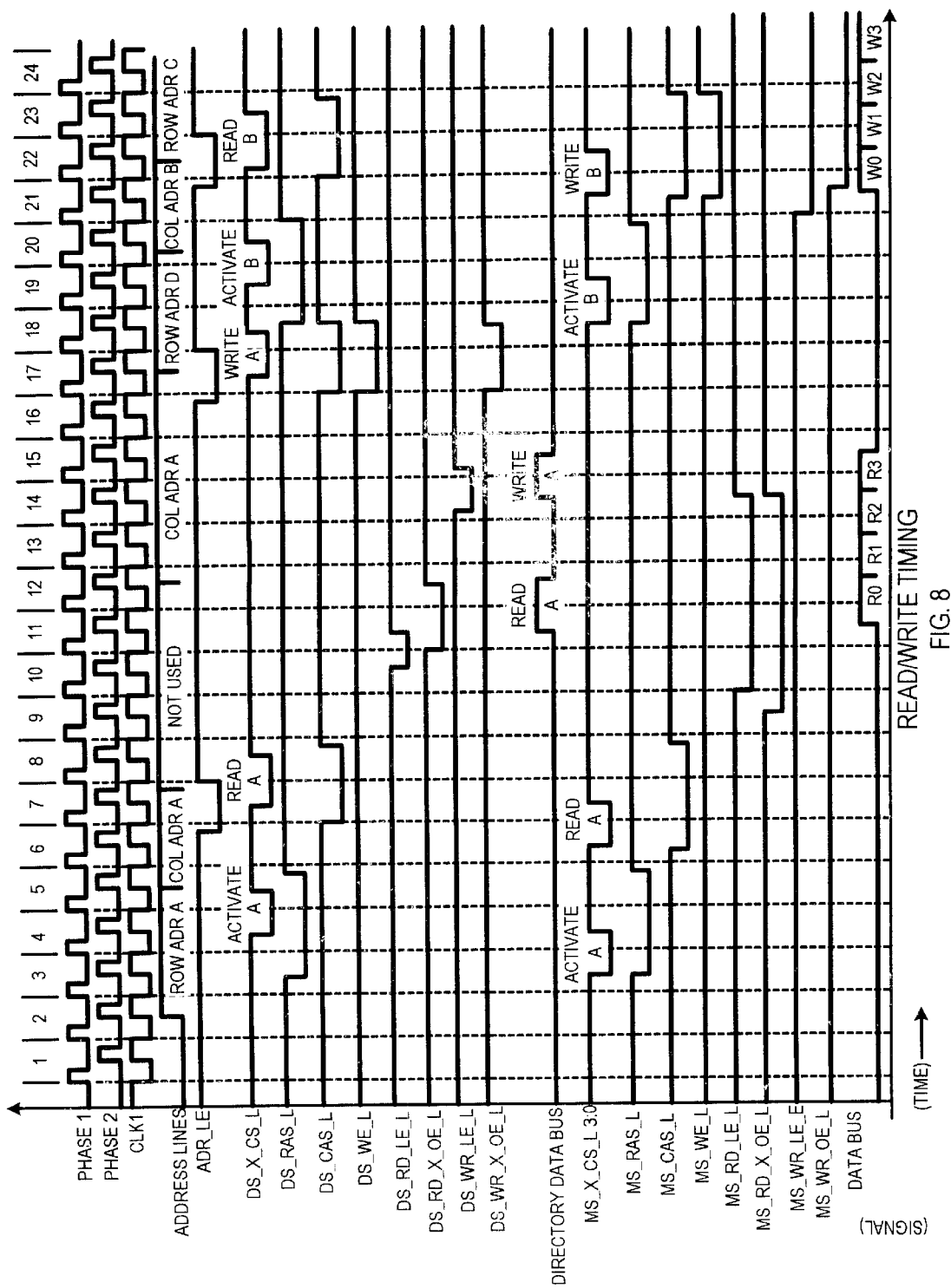
FIG. 8 is a timing diagram of a Read Operation in sequence with a Write Operation, with both operations being performed to the same MSU Expansion.

FIG. 8 is a timing diagram of a Read Operation in sequence with a Write Operation, with both operations being performed to the same MSU Expansion 410A. For illustration purposes, the Read Operation is shown as being to Address A in Bank 0 508 and the Write Operation is shown as being to Address B in Bank 1 510.

The Read Operation to Address A occurs in a manner similar to that described above. However, unlike the case involving the two successively performed Read Operations as shown in FIG. 6, when a Write Operation follows the Read Operation, the MCA does not interleave the addresses for the two operations on Address Lines 530. After the MCA drives the Address A Column Address, the Address Lines 530 are idle until the Address A Column Address is re-driven to write the updated directory state information for Address A to the Directory Storage Array 430A. After the Address A Column Address has been provided to Bank 0 502 for the requisite amount of time, and while the write operation to Bank 0 502 is being completed, the MCA begins driving the Address B Row Address and Bank Selection signals to activate Bank 1 for the Write Operation. Therefore, although address interleaving is not performed as in the cases discussed above, some overlapping of operations is achieved. It may be noted that a third address (shown as Address C) may be provided by MCA 350 to Bank 0 508 following the de-assertion of the Address B Column Address if the following request is another write operation that maps to Bank 0 508. This results in the initiation of a write/write interleaved sequence as discussed above in reference to FIG. 6.

Interleaving of requests is not performed in the case of Read Operations followed by Write Operations because of the timing requirements of the read data as compared to the write data on Data Bus 340A. If a Write Operation were to be initiated five clock cycles after the activation of a Read Operation to the other bank, a bus collision would result on the Data Bus 340A. Therefore, the Write Operation is not initiated until after the read-modify-write operation for Address A is completed.

Finally, it will be noted that although the above examples illustrate interleaving two successively performed read requests, or two successively performed write requests, to the two banks located within a single MSU Expansion 410, the interleaving may be performed in the same manner to any of the banks coupled to the same Address Bus 440. For example, in FIG. 4, Address Bus 440A is coupled to MSU Expansion 410A and 410C, each of which includes a Bank 0 and a Bank 1 as shown in FIG. 5. Therefore, Address Bus 440A is associated with four memory banks. Request interleaving can be performed to any two of the four banks in the manner described above.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following Claims and their equivalents.

What is claimed is:

1. A memory system for providing memory storage for multiple processors through cache memories associated with said multiple processors, said memory storage system comprising:

at least one memory cluster having at least one data storage array—directory storage array pair, wherein both said data storage array and said directory storage array of a said pair are addressed by an address line wherein a single indicated address provided on said address line addresses an associated storage line in both said data storage and said directory storage at a same time, and wherein said data storage array is coupled to store data signals from said processor-associated cache memories, and for providing addressed ones of said stored data signals to a one of the processor-associated cache memories during a data read operation, and coupled to write data signals into indicated addresses within said data storage array when said data signals are received from a one of the processor-associated cache memories during a data write operations, said directory storage arrays for performing a read-modify-write operation for said indicated address in said directory storage array during substantially every read operation and for substantially every write operation performed by said data storage arrays; and a memory cluster control circuit coupled to each said data storage array—directory storage array pair in said memory cluster, for providing via a control line, control signals to each said data storage array and each said directory storage array in said memory cluster, and for initiating each of said data read and data write operations wherein said memory cluster comprises a plurality of said data storage array—directory storage array pairs, and wherein memory cluster control circuit has interleaving means for providing to each said data storage array—directory storage array pair in said memory cluster in a time overlapped manner via said address line, a plurality of addresses, and via said control line, associated control signals for initiating a multiplicity of concurrently performed data read and/or data write operations in the data storage arrays of said data storage array—directory storage array pair, while initiating performance of a read-modify-write in the directory storage array of each said data storage array—directory storage array pair for each read or write operation.

2. For use in a data processing system having multiple processors and one or more store-in type cache memories coupled to ones of the multiple processors, a uniform memory access memory system, comprising:
- a uniform memory access data memory system to store data signals and coupled to the store-in type cache memories to provide said stored data signals to said store-in type cache memories during data read operations, and to receive data signals from said ones of the store-in type cache memories during data write operations, said data memory system capable of concurrently performing a multiple number of said data read and said data write operations,
- a directory memory system, coupled to said ones of the store-in type cache memories to store, for each of said stored data signals, directory state information indicating the identity of a particular one of said store-in type cache memories store in a said each of said data signals, said directory memory system to perform read-modify-write operations in said directory memory system in parallel with each of said data read or said data write operations, each of said read-modify-write operations to retrieve from said directory memory system associated directory state information for the data signals being transferred during said data read or said data write operations of said uniform memory access data memory system, and to thereafter store an updated version of said associated directory state information to said directory memory system, said directory memory system being capable of concurrently performing a multiple number of said read-modify-write operations, and
- a common address bus coupled to said data memory system and said directory memory system whereby said data memory system and said directory memory system receive memory addresses and associated control signals to initiate said multiple number of said data read operations, said multiple number of data write operations, and said multiple number of read-modify-write operations,
- wherein said memory addresses and said associated control signals for said multiple number of said data read operations or said multiple number of said data write operations are provided to said data memory system and said directory memory system in an interleaved manner via said common address bus.

3. The memory system of claim 2, wherein said data memory system and said directory memory system are comprised of memory devices of similar hardware technologies.

4. The memory system of claim 2, wherein said memory devices are Synchronous Dynamic Random Access Memory (SDRAM) devices.

5. The memory system of claim 2, wherein each of said data read operations and each of said data write operations includes multiple, successively-performed data transfer operations between said one of the cache memories and the data memory system.

6. The memory system of claim 2, wherein said data memory system performs said multiple number of concurrently performed data read and data write operations in a period of time, and wherein said directory memory system performs said concurrently performed multiple number of read-modify-write operations to said directory memory system in substantially the same period of time.

7. For use in a data Processing system having multiple processing units and multiple store-in type cache memories each coupled to one or more of said processing units, a uniform memory access main memory system, comprising:
- one or more data systems each comprising one or more data memory storage devices to store data signals arranged vis-à-vis said multiple processing units in a uniform memory access architecture, each of said data systems coupled to each of the store-in type cache memories to receive memory access requests and in response to each of said memory access requests to perform a memory read operation or a memory write operation, each of said data systems being capable of performing a maximum predetermined number of said memory read operations and said memory write operations in a first predetermined period of time;
- one or more directory systems each comprising one or more directory memory storage devices to store status signals, each of said directory memory storage devices being substantially similar to said data memory storage devices, each of said directory systems coupled to each of the cache memories to receive memory access requests, and in response to each of said memory access requests to perform a read-modify-write operation in a coupled one of said one or more directory systems wherein ones of said status signals are read from said directory system, thereafter modified, and written back to said directory system, each of said directory systems being capable of performing said maximum predetermined number of said read-modify-write operations in substantially said first predetermined period of time,
- one or more shared address and control buses each being coupled to a different associated one of said data systems and each further being coupled to a different associated one of said directory systems, and whereby ones of said memory access requests may be provided to said different associated one of said data systems and to said different associated one of said directory systems simultaneously, and
- wherein each of said memory access requests include address and control signals provided to a selectable one of said data systems and said associated one of said directory systems during multiple transfer operations over the coupled one of said shared address and control buses, and wherein said multiple transfer operations associated with one of said memory access requests may be interleaved with said multiple transfer operations associated with a different one of said memory access requests.

8. The memory system of claim 7, wherein each of said directory systems is capable of performing multiple ones of said read-modify-write operations in parallel.

9. The memory system of claim 7, wherein each of said data systems is capable of performing multiple ones of said memory read operations or multiple ones of said memory write operations in parallel.

10. The memory system of claim 7, wherein multiple ones of said data systems and said associated ones of said directory systems are coupled over the same one of said shared address and control buses, and wherein said multiple transfer operations associated with a memory access request to a first coupled one of said data systems may be interleaved with said multiple transfer operations associated with a memory access request to a second coupled one of said data systems, and whereby said first and second memory access requests may be processed simultaneously.

11. The memory system of claim 7, wherein each of said memory write operations and each of said memory read operations involves the transfer of data signals to, and from, respectively, multiple addressable locations within a selectable one of said data systems during multiple, successively-performed transfer operations.

12. The memory system of claim 7, wherein said data memory storage devices and said directory memory storage devices are Synchronous Dynamic Random Access Memory (SDRAM) devices.

13. For use in a data processing system having multiple processors and one or more store-in type cache memories coupled to associated ones of the multiple processors, a uniform memory access memory system, comprising:

data storage means arranged vis-à-vis said multiple processors in a uniform memory access architecture, for selectively storing data signals and coupled to associated ones of the store-in type cache memories for providing ones of said stored data signals to said ones of the store-in type cache memories during data read operations, and for receiving data signals from said associated ones of the store-in type cache memories during data write operations, said data storage means for concurrently performing multiple ones of said data read or data write operations, directory storage means coupled to said associated ones of the store-in type cache memories for selectively storing directory state information indicating the identity of a one of the store-in type cache memories having a copy of one of said stored data signals, said directory storage means for performing read-modify-write operations in said directory storage means in parallel with each of said data read operations and each of said data write operations of said data storage means, each of said read-modify-write operations for retrieving from said directory storage means directory state information associated with the data signals being transferred during the concurrently performed one of said data read operation or said data write operation, and thereafter for storing an updated version of said associated directory state information to said directory storage means, said directory storage means for concurrently performing multiple ones of said read-modify-write operations;

control bus means coupled to said data storage means; and control means coupled to said control bus means for providing via said control bus means an address and associated control signals to said data storage means, and for initiating each of said data read and data write operations, and for providing to said data storage means in an interleaved manner via said control bus means said address and said associated control signals for initiating said concurrently performed multiple number of data read operations or for initiating said concurrently performed multiple number of data write operations.

14. The memory system of claim 13, wherein said data storage means and said directory storage means are comprised of memory devices of similar technologies.

15. The memory system of claim 13, wherein said memory devices are Synchronous Dynamic Random Access Memory (SDRAM) devices.

16. The memory system of claim 13, wherein said control means is further coupled via said control bus means to said directory storage means for providing an address and associated control signals for initiating each of said read-modify-write operations, and whereby said address and said associated control signals for initiating said concurrently performed read-modify-write operations are provided in an interleaved manner via said control bus means to said directory storage means.

17. The memory system of claim 16, wherein said control means is further for controlling said concurrently performed read-modify-write operations so that retrieval of said directory state information and storage of said updated directory state information for a first one of said concurrently performed read-modify-write operations are interleaved over said control bus means with retrieval of said directory state information and storage of said updated directory state information for a second one of said concurrently performed read-modify-write operations.

18. The memory system of claim 13, wherein during each of said data write operations, ones of said data signals are received from said ones of the cache memories during multiple, successively-performed write data transfer operations for storage to multiple, contiguous, addressable locations within said data storage means, and wherein during each of said data read operations, ones of said data signals are retrieved from multiple, contiguous, addressable locations within said data storage means for distributing to said ones of the cache memories during multiple, successively-performed read data transfer operations.

19. The memory system of claim 13, wherein said data storage means includes means for performing said multiple ones of said concurrently performed data read and data write operations in a period of time, and wherein said directory storage means includes means for performing said concurrently performed multiple ones of read-modify-write operations to said directory storage means concurrently in a substantially same period of time.

* * * * *